Patented Nov. 14, 1939

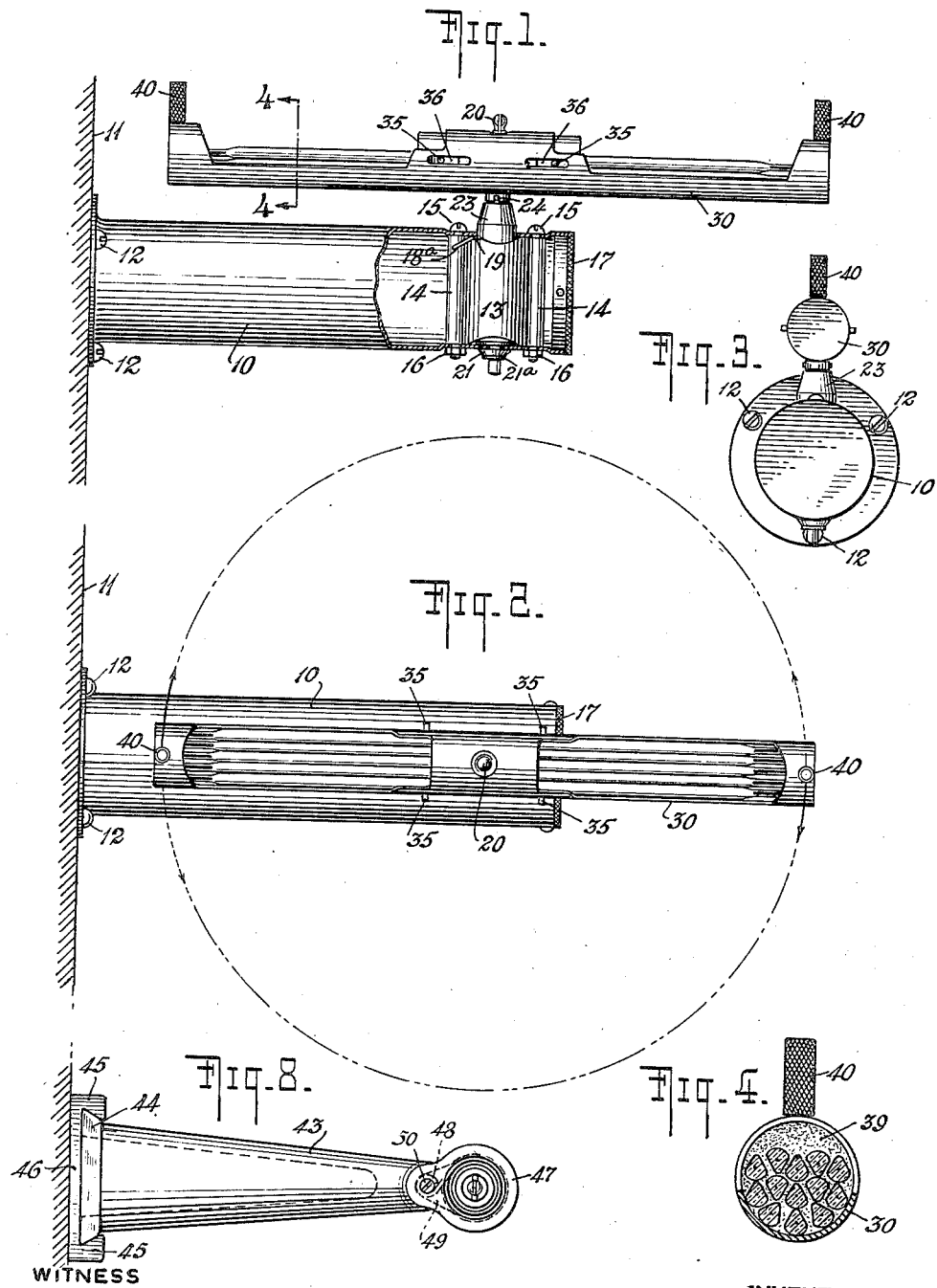

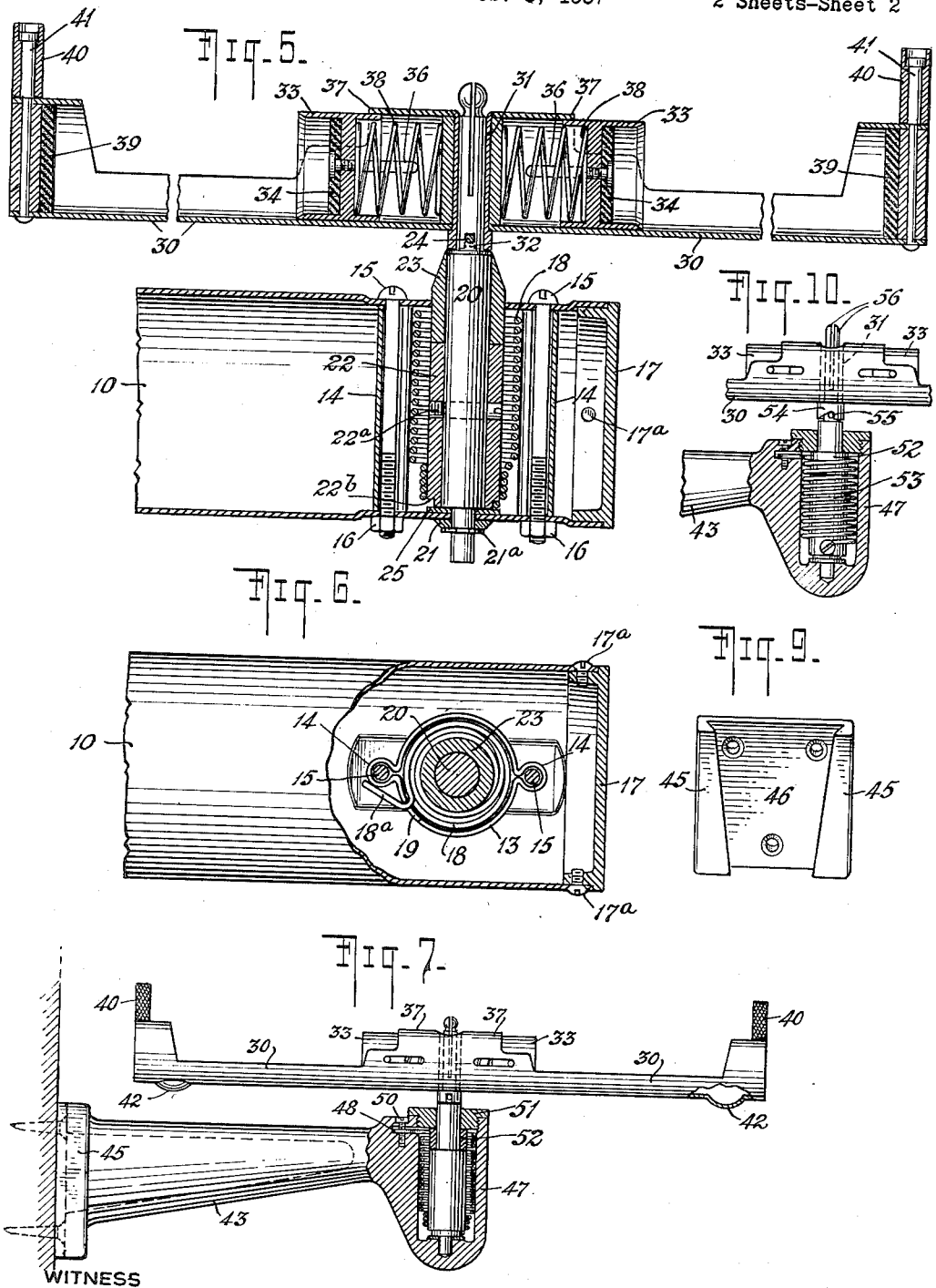

2,179,839

UNITED STATES PATENT OFFICE 2,179,839

THERMOMETER SHAKER

Timothy C. Brosnan, San Francisco, Calif., assignor to Becton Dickinson & Co., Rutherford, N. J., a corporation of New Jersey Application February 8, 1937, Serial No. 124,724

19 Claims. (Cl. 73—373)

This invention relates to mechanism for shaking down clinical thermometers and the object of the invention is to provide an improved, reliable, and convenient apparatus for accomplishing this purpose.

Broadly speaking, the invention contemplates an appliance having one or more receptacles, each of which will be capable of readily receiving a multiplicity of ordinary clinical thermometers and of shaking them all down at once, and it is believed that the appliance of this invention is the first one capable of such performance. All prior mechanisms which have been employed for shaking down clinical thermometers, so far as I am aware, were of such a nature as to require either a specially manufactured thermometer or a separate casing for each thermometer to be shaken down. In contrast to this my new apparatus is so designed that the space occupied by the thermometers in being shaken down is sufficiently large to accommodate a plurality of thermometers, so that a bundle of adjacent or contacting thermometers may be shaken down at one and the same time. Furthermore, all such prior appliances, so far as is known to me, required the action of the human hand during the shaking-down period, either in order to hold the appliance or to operate the same. It is one of the objects of the present invention, in its preferred form, to provide mechanism which during the shaking-down cycle is free from the necessity of contact with the human hand, so that the operator may step to one side and avoid all possibility of contact with the device until it comes to rest. Other objects of the invention will appear during the course of the following description.

The new apparatus is shown in the accompanying drawings in which Fig. 1 is a side elevation of the apparatus with a part of the supporting bracket broken away to show the interior structure; Fig. 2 is a top view of the apparatus shown in Fig. 1; Fig. 3 is an end view of said apparatus; Fig. 4 is a cross-section on an enlarged scale taken along the line 4—4 of Fig. 1, showing a plurality of thermometers in place; Fig. 5 is a detailed longitudinal section on an enlarged scale of the apparatus shown in Figs. 1 and 2; Fig. 6 is a top view of the outer end of the bracket of the apparatus shown in Figs. 1, 2 and 3 with the top of the shell broken away to show the interior structure; Fig. 7 is a side elevation partially in section showing a modification; Fig. 8 is a top view of the bracket shown in Fig. 7 with the cover for the end casing removed; Fig. 9 is a front elevation of the wall piece which supports the bracket shown in Fig. 7; and Fig. 10 illustrates another modification of the apparatus.

In the drawings 10 indicates a support or bracket which in Figs. 1-6 is illustrated as being tubular and provided with a flange at the rear end thereof for convenient attachment to a wall or other support 11 by screws 12 or the like. Mounted within the bracket 10 is a socket or housing 13 having associated therewith the tubular portions 14. A coil spring 18 is contained in the central portion of the housing (see Fig. 5), the upper coils of said spring having a greater diameter than the lower coils thereof and being in contact with or very close to the inner wall of the housing 13 (for reasons to be hereafter explained). The upper end of the spring 18 terminates in a hook 18a (see Figs. 1 and 6) which is positioned for engagement with a notch 19 (see Figs. 1 and 6) cut into the upper edge of the housing 13. When the spring has been inserted in its housing the housing containing the spring is introduced through the outer open end of the bracket 10 and pushed into the position shown in Figs. 1 and 5. Bolts 15, passing through the tubular portions 14 and secured by nuts 16, fixedly position the housing 13 in place in the bracket 10. After the housing 13 has been secured in place, the cover 17 is applied to the forward, previously open, end of the bracket 10 and secured in position by the screws 17a.

The arbor or spindle 20 is inserted within the coil spring 18 through an opening in the top part of the bracket 10 so that it assumes the position shown in Fig. 5. The arbor 20 is preferably constituted of a core of corrosion-resisting steel, the lower reduced end of which projects through the housing as shown in Fig. 5 and is there held in position by the washer 21 and the locking piece 21a. Fixedly associated with the arbor 20 is the sleeve bushing 22, fastened to the arbor for example by the screw 22a. This bushing 22 has a reduced portion at the lower end thereof providing the upper shoulder 22b. In contact with the upper surface of the bushing 22 is the roller bearing 23 through which the arbor 20 loosely extends. The upper portion of the arbor 20 is preferably in the form of a split cylinder of reduced cross-section which terminates in a round knob. A pin 24 extending through the arbor 20 projects from both sides thereof.

The spring 18 in its normal position is somewhat shorter than is shown in Fig. 5 and its upper section is loose from the arbor while its lower reduced section is wound to provide frictional contact with the lower portion of the bushing 22, the very lowermost end of the spring 18, the last winding, having a still smaller diameter so that it will engage beneath the shoulder 22b. When, therefore, the arbor is introduced into the interior of the spring 18 the lower portion of its bushing will at 22b engage the lowest winding of the spring and force it downwardly, elongating the spring and placing it under moderate tension, since the upper part of the spring is prevented from coming down by the engagement between the hook 18a of the spring and the upper edge of the housing 13. Thereupon the washer 21 and its lock piece 21a are fixed in place so that the arbor cannot rise within the housing. Preferably the lower portion of the bushing 22 is made to abut against a bearing washer 25.

In the position of the parts thus far described the lower windings of the spring 18 frictionally encompass the lower portion of the bushing 22 and this portion of the spring is biased against such bushing at said point so that it functions as a clutch which will under certain conditions establish a substantially rigid connection as between the motor and the holder 30, while under other conditions permitting the holder to move or be moved independently of the motor. The spring 18, the housing 13, the bushing 22, and the roller bearing 23 are so dimensioned with relation to each other that when the spring is subsequently wound up to give it the properties of a spring motor, such winding-up of the spring will be limited to say a maximum of four or five revolutions of the arbor, at which time all of the windings of the spring will be in contact with the exterior surfaces of the bushing 22 and the roller bearing 23 so that further winding up becomes impossible. When, however, the spring, after being wound up, is permitted to operate as a spring motor and unwind to its normal condition, its outer surfaces will contact with the inner wall of the housing 13 so that thereafter it can be unwound no further and the momentum induced by the motor effect of the spring is then braked by the lower or clutch part of the spring. In other words, the relation of the parts last described serves to bring the spring motor to a stop right after the spring motor has spent its motor force, from which point on the arbor is under braking influence. In the instant construction, the holder 30 will revolve four or five revolutions before the spring has spent its motor force, the braking action of the lower portion of the spring then functioning to overcome the momentum of the holder and bring the holder to rest at the end of approximately four more revolutions. The effect of this arrangement is to eliminate back and forth movement of the holder 30 at the end of its centrifugal spin and to cause said holder to come to rest at a point in the direction of the centrifugal movement.

As the spring is wound up into a spring motor the upper coil will come into contact with the roller bearing 23 and as soon as this occurs the roller bearing will be frictionally held by the winding and thereafter, on further rotation of the arbor 20, further tightening of the spring windings will take place without rotating the roller bearing 23. This feature is of importance in that, if the roller bearing 23 were omitted and the bushing 22 were extended to take its place as a fixed part of the arbor 20, the upper portion of the spring would rapidly wear out that part of the bushing and require a repair or replacement, whereas with the freely moved roller bearing the tendency of destructive wear is prevented.

At the upper part of the structure there is a trough-like thermometer carrier or rotor 30. In its preferred form the rotor 30 is constituted of two thermometer pockets, each similar to the other and both extending at right angles to the arbor 20. The carrier 30 is provided with a central tubular sleeve 31 adapted to fit over the upper portion of the arbor 20 and having slots 32 adapted to engage with the ends of the pin 24 of the arbor. The thermometer pockets of the carrier 30 are shown as open at their tops and closed at their bottoms to form semicircular supports or trays, each being of a size ample to accommodate a plurality of clinical thermometers as illustrated in Figs. 1, 2, and 4. At the inner ends of the thermometer-supporting parts of the rotor 30 there are cylindrically-shaped retractable plungers 33, each carrying a soft rubber cushion 34 and having a pin and slot connection 35, 36 with the portion 37 of the thermometer carrier. The retractable members are biased toward the outer portions of the thermometer holder 30 by springs 38. At the outer ends of the thermometer holder 30 there are soft rubber cushions 39 against which the bulb ends of the thermometer bear. At the outer extremities of the thermometer holder are the hand pieces 40 rotatably mounted on the spindles 41. When the apparatus is in the condition shown in Figs. 1 or 5, a number of thermometers are positioned in place with their bulbs facing the cushions 39 and their upper ends the cushions 34. While the longitudinal thermometer-carrying space provided for each portion of the thermometer holder is longer than the longest clinical thermometer, the distance between the upper portion of the shell 30 at its outer extremity and the upper portion of the sleeve 33 in the normal position of the latter is smaller than the shortest clinical thermometer so that in connection with the insertion of the thermometers the sleeves 33 are retracted temporarily to enable the thermometers to be placed in the holders.

The thermometers which are to be shaken down are preferably assembled in groups and one set inserted in each of the two compartments of the thermometer holder 30. In inserting the thermometers into a compartment of a holder, the bulbs are placed in contact with the soft end cushion 39 and the operator then moves back the retractable member 33, lays down the thermometers in the compartment, and finally lets the member 33 move back under the influence of the spring 38, whereby the thermometers are placed under soft, longitudinal, compressive strain between the cushions 34 and 39. The individual thermometers may be spaced apart by the use of adapters. If the thermometers are not all of the same length, they can be conveniently manipulated by applying a rubber band to the outside of the set of thermometers and in that event the bulbs will all be adjacent to each other, but the longer thermometers will be the only ones in contact with the cushion 34 in the retractable member 33. The rubber band connection around a group of thermometers suffices, however, to maintain the proper position of all of the shorter thermometers.

The operator, having filled the holder 30 with thermometers to be shaken down, places the holder 30 upon the spindle 20. By now manipulating one of the handles 40 in one direction, for instance the counter-clock direction, there will be no interconnection of the several parts of the apparatus because the spindle 20 and the bushing 22 will slip with relation to the reduced lower end portion of the coil spring 18. This feature, however, permits the operator to properly seat the holder 30 on the spindle 20 so that the projecting ends of the pin 24 will come into registry with the slots 32. By now manipulating one of the handles 40 in a clockwise direction the effect will be to cause the reduced lower end portion of the coil spring 18 to grip the lower end of the bushing 22 tightly and to put the entire upper portion of the spring 18 under tension, thereby winding up the spring. The number of revolutions through which the holder is turned in a clockwise direction or the degree to which the spring is wound may be regulated by the number of thermometers carried in the holder. For example, I have found that when the holder contains from one to twelve thermometers, it is only necessary to turn the holder through two revolutions to produce a tension in the spring 18 capable of effecting the proper shaking-down action on such thermometers and that for each additional dozen of thermometers added to the holder it is only necessary to turn the holder through one more revolution. This arrangement therefore provides a selective means for applying the correct amount of force necessary for any given number of thermometers and an indicating means may be provided on the device to indicate to the operator the correct amount of force to apply to the spring for the number of thermometers being shaken down. Although the spring may be selectively wound for a given number of thermometers, the arrangement and construction of the parts of the device are such that if the operator should place full tension on the spring for one or a few thermometers, no damage will result to such thermometers, but, of course, he will be utilizing more energy than is necessary for the shaking-down operation. When the operator then lets go of the handle 41, the holder 30 is subjected to a rotative motion of sufficient speed to produce a centrifugal force capable of shaking down all of the thermometers contained in the holder. The spring 18 cannot be over-wound, as previously explained, and, when it has completely relaxed at the end of its unwinding activity, it comes to rest without momentum beyond the stopping point. The operator then removes the thermometers by pushing back the retractable plungers 33 against the tension of the springs 38 and taking the thermometers from the holder. Before thermometers are shaken down it is preferable to have them sterilized and if there should be any small amount of adhering moisture, that moisture will be dissipated by the centrifugal action in conjunction with the circumstance that the thermometers are rapidly passing through air. Catch basins 42 may be provided at each end of the holder to catch the moisture driven off by the centrifugal action, as is shown in Fig. 7. Due to the removability and simple construction of the holder, the thermometers can be sterilized in it prior to mounting such holder on the spindle 20.

The apparatus has many advantages which are probably best appreciated in hospitals or other institutions where many thermometers must be used daily. The shaking down of the individual thermometers one at a time has been one of the most troublesome and annoying features of hospital work. If a thermometer is not properly shaken down it may not register correctly the condition of the patient. With the installation of the new apparatus in a hospital every thermometer once used is returned to the sterilization room where a plurality of used thermometers are thoroughly sterilized. Then the holder 30 is filled and in a mere fraction of time dozens of thermometers are shaken down at once, taken out, and placed so as to be available for use. The action of the instrument is so speedy that the time factor is negligible, especially in contrast with the time formerly required to shake down thermometers by hand, say in a ward containing forty patients whose temperatures are to be taken once an hour. The thermometer holder can be kept in a compartment where the thermometers are kept so that normally such holder is not in a position where it might obstruct free passage or catch in a garment. Many other advantages flow from the use of the new instrument and from practical experience it seems to be a most sought-after development.

From the above description it will be seen that the invention provides an improved, reliable, and convenient instrument which is particularly well adapted for the purposes for which it was devised and it will also be evident that the above-described device is susceptible of considerable change without material departure from the principles and spirit of the invention. For example, in Figs. 7 to 9 of the drawings, I have shown a variation of the support for holding the operating mechanism and the thermometer carrier. In this embodiment of the invention the supporting bracket includes a tapered hollow body portion 43 provided with a pair of inclined flanges at its inner end adapted to be inserted between the inclined supporting sides 45 of a wall piece 46 and at its outer end with an integral cylindrical housing or casing 47. The casing 47 is provided at its lower end with a bearing support having a recess for receiving the reduced lower end of the spindle 20. A washer may be disposed between the lower end of the spindle 20 and the top surface of the bearing support. In this embodiment of the invention the spring 18, spindle 20, bushing 22, and the roller bearing supported at the top of the bushing 22, is inserted through an opening in the top of the casing. The upper end of the spring 18, in this embodiment, is provided with an annular offset portion 48 which is adapted to be inserted in a horizontally disposed recess 49 formed in the side wall of the casing. A screw 50 is threaded through the opening of the offset portion and secures this end of the spring in the recess. A screw-threaded cover 51, having a central opening through which the spindle 20 extends, seals the chamber in the casing. It will be noted that in this form of the invention the roller bearing 52 is substantially shorter than the roller bearing 23 in the construction shown in Figs. 1 to 6, and is contained entirely within the casing when the cover 51 is in closed position. It is also within the contemplation of the invention to combine the cover 51 and bearing 52 so that the upper windings of the spring will enclose the stem of such closure. The advantages of this construction are that the chamber in the casing may be filled with a lubricant to insure a minimum of friction in the working of the parts, to prolong the life of the parts and act as a sound damper for the enclosed mechanism. By reason of the detachable nature of the support the unit may be kept in a suitable compartment when not in use and the same unit may be used in a number of different places, it only being necessary to have a plurality of the wall members which are of a simple and inexpensive construction conveniently mounted in those places where the device will be used.

In Fig. 10 I have shown another form of the device wherein the ratchet type of spring illustrated in Figs. 1–9 is replaced by a plain spring 53 which is secured at its upper end to the casing 47 in the manner shown in Fig. 7 and at its lower end to the spindle 20 by means of a screw. In this form of the invention the cushioned stop action is obtained by the arrangement of the holder with relation to the reduced upper portion of the spindle. As shown in Fig. 10 the holder 30 is operatively connected to the spindle by the ratchet members 54, 55 so that after the spring motor has spent its motor force and the spindle 20 has come to a stop because the spring 53 is prevented from further unwinding by the inner wall of the casing, the ratchet members will disengage under the momentum imparted to the holder and the latter will rise on the upper reduced portion of the spindle slightly contracting the spaced spring fingers 56 of the latter. As the holder 30 rotates about the upper portion of the spindle the spaced spring fingers of the latter will exert an outward pressure against the inner wall of the tubular sleeve 31, the friction generated therebetween acting to gradually overcome the momentum of the rotating holder and bring it to a cushion stop. In the construction shown in Fig. 10 the upper reduced portion of the arbor or spindle is not provided with a round knob in order to provide a greater frictional surface between the split spring fingers of the spindle and the sleeve 31, but it will be understood that a round or oval shaped knob may also be provided on this construction to provide an upper stop for limiting the upward movement of the holder. In this case the upper reduced portion of the spindle may be slightly longer than the same portion of the spindle shown in Figs. 1, 5, and 7.

It is apparent that many other changes can be made in details without departing from the scope of the invention and that it is intended that the scope of the claims shall be adequate to cover any such modifications or substitution or equivalents as will enable the substituted parts to accomplish the same effects in substantially the same way as they are accomplished by the apparatus which is the subject of this specification.

I claim:

1. A device for shaking down clinical thermometers comprising a rotor having a thermometer-receiving tray extending outwardly from the rotational axis of said rotor, said tray having a cross-sectional area for the thermometer-receiving portion of the tray greater than that of a plurality of clinical thermometers, whereby a plurality of such thermometers in close contact with one another may be contained therein at the same time, a cushion end stop in said tray adapted to engage with the bulb end of a thermometer and to limit outward movement of such thermometer during the revolving motion of said tray, yieldable means mounted for longitudinal movement within said tray and adapted to engage the opposite end of such thermometer and to maintain the bulb end thereof in contact with said stop, guide elements provided on said rotor and said yieldable means, said guide elements being operatively connected together and adapted to limit said yieldable means to a movement longitudinally of said tray and means for imparting to said rotor a rotational movement capable of generating sufficient centrifugal force to shake down the thermometers carried in said tray.

2. A device for shaking down clinical thermometers comprising a rotor having a thermometer-receiving tray extending outwardly from the rotational axis of said rotor, said tray having a cross-sectional area for the thermometer-receiving portion of the tray greater than that of a plurality of clinical thermometers, whereby a plurality of such thermometers in close contact with one another may be contained therein at the same time, a stop in said tray adapted to limit outward movement of a thermometer during the revolving motion of said tray, a plunger disposed at the inner end of said tray and movable towards said stop, a spring member arranged to normally bias said plunger towards said stop, guide elements provided on said tray and said plunger and coacting to limit said plunger to a movement longitudinally of said tray and means for imparting to said rotor a rotational movement capable of generating sufficient centrifugal force to shake down the thermometers carried in said tray.

3. A device for shaking down clinical thermometers comprising a rotor having a thermometer-receiving elongated tray supported thereon so that its longitudinal axis extends outwardly from the rotational axis of such rotor, said tray having a cross-sectional area greater than that of a plurality of clinical thermometers, whereby a plurality of such thermometers in close contact with one another may be contained therein at the same time, said tray including a stop at its outer end adapted to be engaged by one end of a thermometer disposed therein, a plunger disposed at the inner end of said tray and arranged for movement longitudinally of said tray, a stop limiting the outward movement of said plunger, a coiled spring arranged to force said plunger towards said second mentioned stop and into engagement with the other end of a thermometer disposed in said tray, the outer thermometer-engaging end of said plunger being recessed to provide a collar adapted to enclose said other end of the thermometer and to lock a thermometer engaged by said plunger and outer end stop in said tray and means for imparting to said rotor a rotational movement capable of generating sufficient centrifugal force to shake down the thermometers carried in said tray.

4. A device for shaking down clinical thermometers comprising a rotor having a thermometer-receiving elongated trough-like member supported thereon so that its longitudinal axis extends outwardly from the rotational axis of such rotor, said member having a thermometer-receiving length at least as long as that of a clinical thermometer and capable of holding a plurality of clinical thermometers in close contact with one another, an outer stop in said tray adapted to be engaged by a thermometer disposed therein, a spring tensioned plunger disposed at the inner end of said member and adapted to yieldably engage the other end of a thermometer disposed in said member, said member and plunger having guards enclosing the ends of thermometers disposed in said member, whereby such thermometers are locked therein during the operation of the device, guide means provided on said member and plunger and coacting together to limit the movement of said plunger with relation to said member and means for imparting to said rotor a sudden rotational movement capable of generating almost instantaneously sufficient centrifugal force to shake down the thermometers carried in said tray.

5. A device for shaking down clinical thermometers comprising a revolvable shaft, a rotor having a thermometer-receiving receptacle supported on said shaft and actuating means for driving said shaft to revolve said rotor, said means including an axial member operatively associated with said shaft, a coiled spring encompassing said member, said spring having one portion closely wound about a portion of said member, the remaining portion of said spring being free from the member and having an end immovably anchored.

6. A device for shaking down clinical thermometers comprising a support, an arbor mounted thereon, a rotor having a thermometer-receiving receptacle supported on said arbor and actuating means for driving said arbor to revolve said rotor, said means including an axial member operatively associated with said arbor, a coiled spring encompassing said member, said spring having one portion closely wound about a portion of said axial member, the remaining portion thereof being free from said member, the end of said free portion of the spring being anchored at a point spaced from said axial member and the distance between the inner surfaces of such portion of the spring and the axial member being just sufficient to enable the spring to be wound up by rotation of the arbor to an extent required for shaking down thermometers.

7. A device for shaking down clinical thermometers comprising a casing, an axial member mounted in said casing, a rotor having a thermometer-receiving receptacle operatively connected to said axial member, a spring motor disposed in said casing and surrounding said axial member, the outside diameter of said spring in its normal condition being substantially the same as the interior diameter of said casing to prevent the spring from expanding after it has expanded its motor force, and clutch means operatively connecting said spring with said axial member and adapted to enable said rotor to wind up said spring when it is turned in one direction and to enable said wound spring to drive said rotor upon release of the latter, said clutch means comprising a spring member forming a part of said spring motor and being associated with said axial member so that it becomes ineffective as a clutch when said spring motor has returned to its normal condition and thereafter functions as a friction brake upon said axial member to bring the rotor to a cushion stop.

8. A device for shaking down clinical thermometers comprising a balanced rotor having a plurality of thermometer-receiving receptacles, each of which is adapted to hold a plurality of thermometers, means associated with each of said receptacles to prevent displacement of thermometers disposed therein, a support adapted to be attached by a physical connection to part of a room or its furnishings, an axial member mounted on said support and revolvably supporting the said rotor, a spring motor surrounding said axial member, said spring motor including a spring clutch for operatively associating said axial member in operative relation with said motor and adapted to enable said spring motor to be wound while the rotor is rotating in one direction and to enable said spring motor to drive said rotor when the rotor is released, said spring clutch being also adapted to grip said axial member and to function as a friction brake against rotational movement of said axial member when the spring motor has ceased driving said rotor to bring said rotor to a cushion stop without idling.

9. A device for shaking down clinical thermometers comprising a casing, an axial member mounted in said casing, an annular element surrounding a portion of said axial member, a rotor having a thermometer-receiving receptacle supported on said axial member, a spring motor disposed in said casing and encircling said axial member, one end of said spring motor encircling said annular element and being attached to said casing adjacent the same, the said element being adapted to shield the axial member from destructive wear due to the friction generated by the coils close to the point of anchorage of said spring and a ratchet spring connected to the other end of said spring motor and encircling said axial member for associating said rotor in operative relation with said spring motor to enable said rotor to wind up said spring about said axial member when it is turned in one direction and to enable said spring to drive said rotor upon release of the latter.

10. A device for shaking down clinical thermometers comprising a revolvably supported rotor having a thermometer-receiving receptacle, an axial member, a spring motor for driving said rotor, said spring motor encircling said axial member and including an end portion closely wound about said axial member to enable said rotor to wind said spring motor when it is rotated in one direction and to enable said spring motor to drive said rotor in the other direction, the free end of said end portion of the spring motor being unanchored to said axial member so that it is adapted upon the expenditure of the motor force in said spring motor to become ineffective as a driving means and thereafter to function as a brake upon said axial member to rapidly decelerate the rotational speed of said rotor.

11. A device for shaking down clinical thermometers comprising a revolvably supported rotor having a thermometer-receiving receptacle, an axial member, a coiled spring motor for driving said rotor, said spring motor encircling said axial member and including a motor section having an interior diameter sufficiently greater than the exterior diameter of said axial member to enable the spring to be wound to the extent required for shaking down the thermometers carried by said rotor and a clutch section closely wound about a portion of said axial member and adapted to grip said member to enable said motor section to drive said rotor and to become ineffective as a driving means when the spring motor has expended its motor force.

12. A device for shaking down clinical thermometers comprising a revolvably supported rotor having a thermometer-receiving receptacle, a spring motor for driving said rotor and capable of exerting its maximum force instantaneously on said rotor, whereby the thermometers carried thereby are subjected to a sudden application of the centrifugal force required to shake them down, clutch means for enabling said rotor to wind up said spring when it is turned in one direction and for enabling the wound spring to drive said rotor in the opposite direction, said clutch means being adapted to become ineffective for driving said rotor after said motor has delivered the required motor force and including an element adapted thereafter to frictionally engage with a rotating portion of said rotor and to function as a friction brake to bring the rotor to a cushioned stop, and means for limiting the winding and unwinding of said spring motor so that a predetermined amount of motor force is delivered to said rotor.

13. A device for shaking down thermometers comprising a rotor having a thermometer-receiving receptacle extending outwardly from the rotational axis of said rotor, an axial member operatively connected to said rotor, a spring motor encircling said axial member and including a section closely wound around a portion of said axial member for associating said axial member in operative relation with said spring motor to enable said rotor to wind up said spring motor when it is turned in one direction and to enable said spring motor to drive said rotor upon release of the latter, said axial member being so dimensioned with relation to said spring motor that the latter cannot be overwound and said section of said spring motor being unanchored to said axial member so that said axial member and said rotor are enabled to continue their rotative motion after the energy stored in said spring motor has been expended.

14. A device for shaking down thermometers comprising an axial member, actuating means for imparting rotational movement to said axial member, a balanced rotor having a thermometer-receiving receptacle and having a central opening adapted to receive one end of said axial member, a pin and slot connection between said axial member and said balanced rotor and said end of the axial member having a longitudinally extending open slit extending into the portion thereof enclosed by said rotor when said pin and slot are interconnected to provide two longitudinally extending spring members arranged to frictionally engage the interior surfaces of the rotor forming the central opening thereof and to resist movement of said rotor relative to said axial member when said pin is disconnected from said slot.

15. A device for shaking down thermometers comprising an axial member, actuating means for imparting rotational movement to said axial member, a rotor mounted on said axial member and including a trough-like container unit having a cross-sectional area greater than that of a plurality of clinical thermometers and adapted to enclose, in part at least, the thermometers disposed therein, said container unit comprising two oppositely disposed inseparably connected walls adapted to engage with the ends of thermometers disposed therebetween and adapted to be moved relative to each other for the placement and removal of thermometers, and means within the confines of said unit for normally biasing the said opposed walls one towards the other to enable said walls to receive a thermometer therebetween and adapted to yieldingly resist movement of said walls away from one another.

16. A device for shaking down clinical thermometers which comprises a revolvable support, a spring motor arranged to impart a limited amount of rotary motion to said revolvable support and having an end portion which surrounds a portion of said revolvable support and is unattached to said support, said end portion of the spring motor having an interior diameter smaller than the interior diameter of the body portion of the spring motor and being closely wound around such portion of the revolvable support to cause it to grip and drive said revolvable support during the driving action of said spring motor and cause it to become ineffective as a driving means and to brake the rotation of said support after the motor has ceased to drive the same, a detachable rotor mounted on said support, means for operatively connecting said rotor to said support while said motor is driving said support and a receptacle carried by said rotor, said receptacle extending outwardly from the rotational axis of said rotor and being capable of holding a plurality of thermometers with their bulb ends disposed outwardly from said support.

17. A device for shaking down clinical thermometers which comprises a support, a rotor mounted on said support and including a trough-like member extending outwardly from said support, said trough-like member having a cross sectional area greater than that of a plurality of clinical thermometers and being capable of receiving and retaining a plurality of clinical thermometers in close contact with one another and with their bulbs extending outwardly from the support, a stop at the outer end of said trough-like member adapted to be engaged by the bulb ends of the thermometers disposed in such member, an adjustable section slidably carried within said trough-like member and disposed at the inner end of the latter and adapted to be shifted lengthwise of said member to provide space for receiving and for removing the thermometers from the trough-like member, a compressed longitudinally disposed spring carried by said rotor for normally biasing said adjustable section towards said outer stop, a cushioning element provided on said section adapted to engage and to form a resilient abutment for the opposite ends of the thermometers and a spring motor surrounding said support and including a spring clutch for associating said support in operative relation with said spring motor to enable the latter to impart rotational movement to said rotor.

18. A device for shaking down clinical thermometers comprising a support, a casing carried by said support, an axial member vertically disposed in said casing, a balanced rotor revolvably supported on said axial member, said rotor including a pair of oppositely disposed trays extending outwardly from the rotational axis of said rotor and each having a cross sectional area greater than that of a plurality of clinical thermometers whereby a plurality of such thermometers may be contained therein at the same time, each of said trays having an elongated opening extending longitudinally thereof and including two oppositely disposed walls connected to one another and adapted to be moved relative to one another for the placement and removal of thermometers through the opening without separating them from their connected relation and to engage with the ends of thermometers disposed therebetween and means within the confines of the trays and forming a part thereof for normally biasing the opposed walls of each tray one towards the other to enable said walls to secure a thermometer therebetween and adapted to yieldingly resist movement of said walls away from one another, a spring motor disposed in said casing and surrounding said axial member, said spring having an outside diameter substantially the same as the interior diameter of said casing and clutch means for associating said rotor in operative relation with said spring motor to enable said rotor to wind up said spring about said axial member when it is turned in one direction and to enable said spring to drive said rotor upon release of the latter.

19. A device for shaking down clinical thermometers, comprising a revolvably supported thermometer-receiving receptacle, actuating means capable of imparting to said receptacle a rotative movement of said intensity that it generates almost instantaneously the required centrifugal force necessary to shake down the thermometers carried in said receptacle, whereby such thermometers are subjected to a sudden application of the required force, said receptacle being arranged with respect to said actuating means so as to be able to continue rotating after said actuating means has ended its driving action, and having associated therewith a surface participating in such continued rotation, means associated with said actuating means but ineffective as braking means during the driving action of the actuating means, to limit such continued rotation of the receptacle and to apply frictional pressure on said surface so as to brake such motion and thereby bring the receptacle to a quick but gentle stop, and means arranged to render the braking action of said last mentioned means effective immediately after said actuating means has ended its driving action.

T. C. BROSNAN.